(12) United States Patent
Tewinkle

(10) Patent No.: US 7,688,128 B2
(45) Date of Patent: Mar. 30, 2010

(54) DIGITAL IMAGING CHIP USING AN ANALOG CLOCK SIGNAL AS A PROVISIONAL CLOCK SIGNAL

(75) Inventor: Scott L. Tewinkle, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 576 days.

(21) Appl. No.: 11/588,041

(22) Filed: Oct. 26, 2006

(65) Prior Publication Data
US 2008/0151323 A1 Jun. 26, 2008

(51) Int. Cl.
*H03K 3/00* (2006.01)
*G06F 1/04* (2006.01)

(52) U.S. Cl. .................. 327/298; 348/294; 348/312; 348/308

(58) Field of Classification Search .......... 358/474; 348/312; 327/298
See application file for complete search history.

(56) References Cited

U.S. PATENT DOCUMENTS

| 6,441,668 | B1 * | 8/2002 | Miller ................ 327/298 |
| 6,570,615 | B1 * | 5/2003 | Decker et al. ........ 348/272 |
| 6,958,833 | B2 | 10/2005 | TeWinkle |
| 2002/0122218 | A1 * | 9/2002 | TeWinkle ............ 358/514 |

* cited by examiner

*Primary Examiner*—David L Ometz
*Assistant Examiner*—Antoinette T Spinks
(74) *Attorney, Agent, or Firm*—Simpson & Simpson, PLLC

(57) ABSTRACT

A method of operating an imaging system, the imaging system including a plurality of subsets of imaging elements, such as photosensors, light emitters, or ink-jet ejectors. The imaging elements use a regular clock signal for operation. A provisional clock signal, such as an analog sinusoidal signal, is generated. A subset of imaging elements is selected for operation at a particular time. The provisional clock signal is converted to a regular clock signal for use by the selected subset of imaging elements, incidental to an operational period of the selected subset of imaging elements.

19 Claims, 3 Drawing Sheets

FIG. 1 (PRIOR ART)
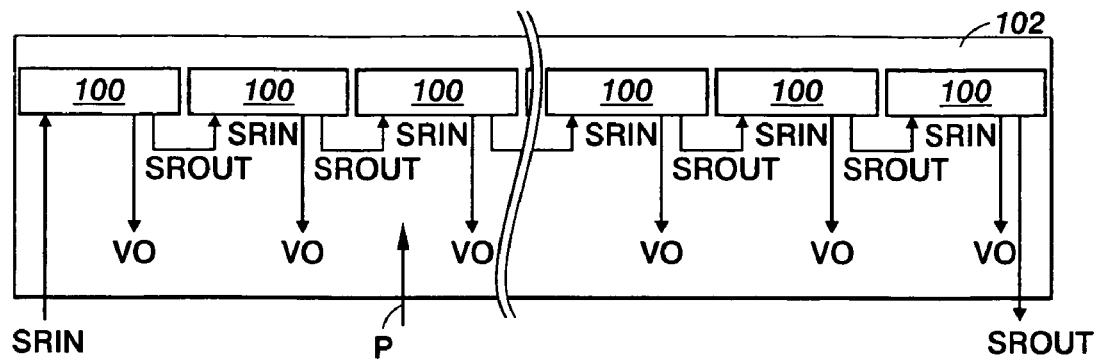
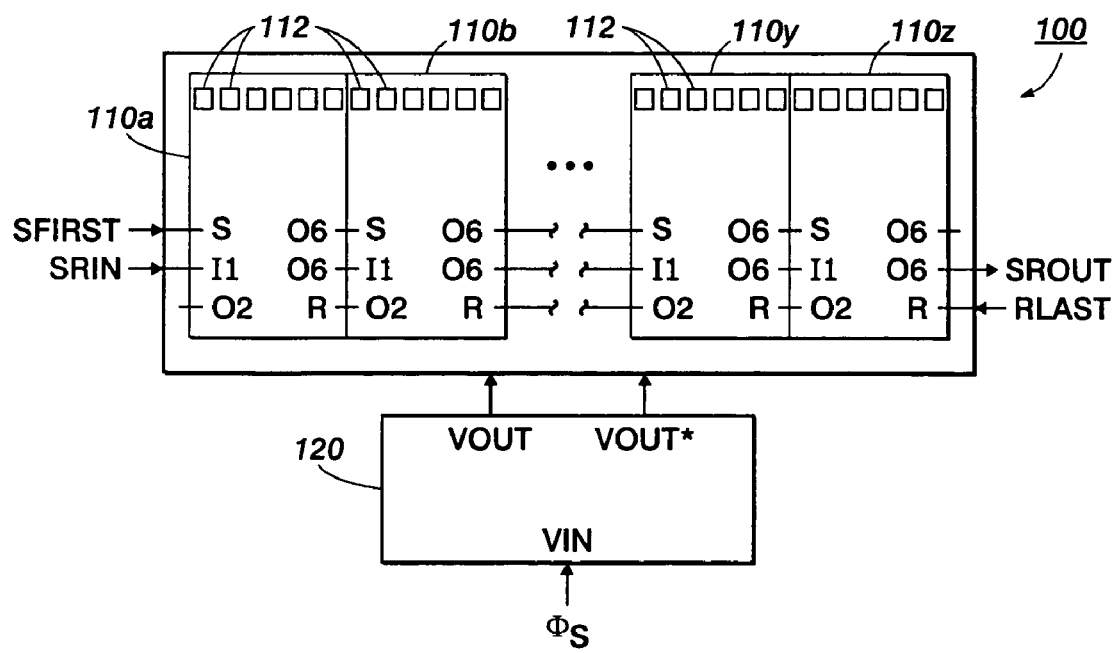
FIG. 2

DIGITAL IMAGING CHIP USING AN ANALOG CLOCK SIGNAL AS A PROVISIONAL CLOCK SIGNAL

TECHNICAL FIELD

The present description relates to imaging chips, herein defined as chips that record images as digital data, such as photosensor chips, or produce images based on input digital data, such as laser emitting chips of ink-jet printheads.

BACKGROUND

Image sensor arrays typically comprise a linear array of photosensors which raster scan an image-bearing document and convert the microscopic image areas viewed by each photosensor to image signal charges. Following an integration period, the image signal charges are amplified and transferred as an analog video signal to a common output line or bus through successively actuated multiplexing transistors.

For high-performance image sensor arrays, a preferred design includes an array of photosensors of a width comparable to the width of a page being scanned, to permit one-to-one imaging generally without the use of reductive optics. In order to provide such a "full-width" array, however, relatively large silicon structures must be used to define the large number of photosensors. A preferred technique to create such a large array is to make the array out of several butted silicon chips. In one proposed design, an array comprises of 20 silicon chips, butted end-to-end, each chip having 372 active photosensors spaced at 600 photosensors per inch.

Besides photosensor arrays, there are other types of multi-chip systems useful in recording or making images. In xerographic systems, there can be provided "LED arrays," meaning chips in which a linear array of a laser emitters are used to discharge imagewise areas on a photoreceptor for xerographic printing purposes. Also, many designs of ink-jet printheads include, on a chip, a series of independently-addressable ink-jet emitters.

Whether an imaging chip is used for recording images or creating images, a common feature in such chips is the use of a shift register, the stages of the shift register being in various possible ways associated with the different "imaging elements" (e.g., photosensors, light emitters, ink-jet emitters, and associated circuitry), so that individual imaging elements can be addressed at various times, such as for image input or image readout.

Imaging systems of various types typically require a "clock signal" of predetermined frequency to enable orderly transfer (in or out) of image data, such as with a shift register. A typical clock signal used in digital systems is a 5-volt square wave of predetermined frequency. One practical difficulty of using a digital square wave comes from the fact that abrupt changes in voltages cause transients to be associated with the power supply for the whole system; these transients in turn can be associated with noticeable signatures at the rising edge and trailing edge of each pulse.

U.S. Pat. No. 6,958,833 shows an imaging chip, in this case a photosensor array chip, where a plurality of local clock drivers, each clock driver operative of a small subset of photosensors, are selectable, so that only photosensors needed for a particular imaging purpose, such as scanning a small document, are used to generate image signals.

SUMMARY

According to one embodiment, there is provided a method of operating an imaging system, the imaging system including a plurality of subsets of imaging elements, the imaging elements using a regular clock signal for operation. A provisional clock signal is generated. A subset of imaging elements is selected for operation at a particular time. The provisional clock signal is converted to a regular clock signal for use by the selected subset of imaging elements, incidental to an operational period of the selected subset of imaging elements.

BRIEF DESCRIPTION OF THE DRAWINGS

FIG. 1 is a simplified view of a multi-chip "full-width array" image sensor as would be used, for example, in a digital copier.

FIG. 2 is a simplified view of a single photosensor chip, showing aspects relevant to the present disclosure.

DETAILED DESCRIPTION

Figure 3:
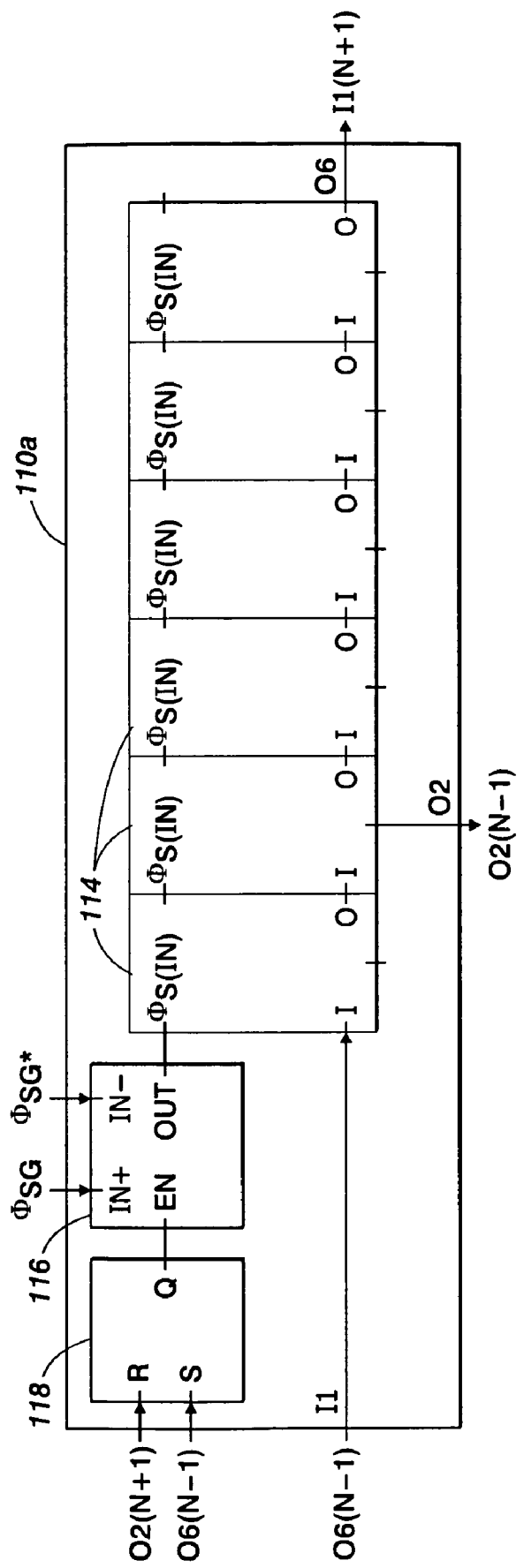
FIG. 3 is a simplified view of circuitry, particularly shift register stages, associated with a single subset of photosensors, showing aspects relevant to the present disclosure.

FIG. 1 is a simplified view of a multi-chip "full-width array" image sensor as would be used, for example, in a digital copier. A plurality of chips, here each indicated as 100, are arranged on a substrate 102, thus forming a bar that can extend the width of a sheet to be scanned or copied, such as in a digital copier. Each chip includes at least one linear array of photosensors (not shown in the Figure) with associated circuitry, and together the set of chips 100 can output image signals as though the chips formed a single linear array. In the context of an input scanner for a digital copier, a hard-copy image to be recorded would pass relative to the substrate 102 through process direction P; the photosensors on chips 100 record reflected light from a series of pixel-size areas on the moving sheet and output video signals over time, thus allowing the image on the sheet to be recorded in digital form. Each chip 100 includes a video out line VO for the output of video signals, as well as shift register lines SRIN and SROUT; as will be seen below, the shift register lines control the output of video signals from the photosensors.

FIG. 2 is a simplified view of a single photosensor chip 100, showing aspects relevant to the present disclosure. An array of typically hundreds of photosensors across the chip 100 is effectively divided into subsets 110a, 110b, ... 110z. In this example, each subset includes six photosensors 112. (Although a linear array of photosensors is here discussed, the teachings herein can readily be applied to two-dimensional photosensor arrays.) A set of inputs and outputs is associated with each subset, including a clock signal $\phi_{S(IN)}$. In the embodiment, the output of the sixth shift register stage in each subset (shown as O6) feeds into the input of the first shift register stage of the next subset (shown as I1), while a reset signal R associated with each subset feeds into the second shift register stage in the next subset (shown as O2).

FIG. 3 is a simplified view of circuitry, particularly shift register stages, associated with a single subset of photosensors 110a, showing aspects relevant to the present disclosure. Within each subset such as 110a there are provided, in this embodiment, a set of shift register stages 114, each stage associated with a photosensor 112, as shown in FIG. 2. In brief, a digital "1" moves through each of the shift register stages 114, and causes the stage to activate its associated photosensor circuitry, thus causing the photosensor to load a video signal onto an output line (such as VO, described above with reference to FIG. 1). The inputs (I) and outputs (0) to the various stages are shown in FIG. 3: as can be seen, for each subset such as 110a, the input to the shift register enters from the output of the previously selected subset O(N−1), passes through the stages 114, and then passes as a input to the next selected subset I(N+1). The inputs of sinusoidal clock signals φS$_G$ and φS$_G$* will be described in detail below.

As is familiar in designing and operating shift registers for imaging purposes, the movement of the digital signal through the stages of a shift register is coordinated by a regular clock signal. Typically, the clock signal is a digital square wave, of 5V amplitude and a predetermined frequency. In a standard design of an imaging chip, the clock signal is externally supplied to each imaging chip, and is in many cases supplied to a chip whether the chip is activated at a given time or not. The presence of a square wave at all times within a chip or a larger system can have many attendant disadvantages: power consumption, heat generation, and transient effects on the system power supply.

To overcome these practical disadvantages, the present disclosure provides a "provisional signal" which in many cases can function as the square wave used for the functioning clock signal. In the above-described embodiment of an imaging chip, the shift register stages 114 require a square wave of predetermined amplitude to enable movement of the digital signal from stage to stage. In many known embodiments, the square clock signal is the same signal applied externally to the chip from a power supply. However, with the system of the present disclosure, the square clock signal is applied only to a subset of shift registers selected for use at a given time, such as to cause readout of video signals (or, in the case of an imaging LED or ink-jet printhead, the activation of the LED or ejector associated with each stage). For subsets of imaging elements not being activated at a particular time, there is provided on the chip a provisional signal, typically of the same frequency as the regular clock signal, but of a different quality. For instance, in one embodiment, as will be described in detail below, the provisional signal is an analog, sinusoidal clock signal: such a signal will avoid or attenuate certain performance disadvantages of using the original clock signal φS at all times throughout a chip.

Returning to FIG. 2, there can be seen an analog clock driver 120. The input to the driver 120 is the system square wave φS, which is supplied from an external power supply (not shown). In a basic, prior-art case, the system square wave is applied directly to the various shift registers in a system, but in the present embodiment the signal drives the analog clock driver 120, which in turn outputs complementary analog, sinusoidal clock signals φS$_G$ and φS$_G$*. These analog signals are applied throughout each chip 100.

Turning to FIG. 3, the sinusoidal clock signals φS$_G$ and φS$_G$* are applied to a pixel receiver 116, which operates in combination with a flip-flop 118. The flip-flop 118 has inputs from adjacent subsets of photosensors, O2(N+1) and O6(N−1), which can be seen in FIG. 2: O2 and O6 are respectively the outputs of the second and sixth shift register stages of a subset such as 110a. This arrangement has the effect of activating the pixel receiver 116 only under those conditions where the flip-flop 11b effectively selects that particular subset 110a. The output of the pixel receiver 116 in response to the applied sinusoidal signals φS$_G$ and φS$_G$* is a square wave that effectively mimics the original external square wave φS, and is applied to the shift register stages 114 in the selected subset 110a. However, it should be noted, for all other subsets besides the subset such as 110a being activated at a given time, the clock signal applied thereto is the sinusoidal clock signals φS$_G$ and φS$_G$* The square wave exists on the chip only for the selected subset 110a.

Figure 4:
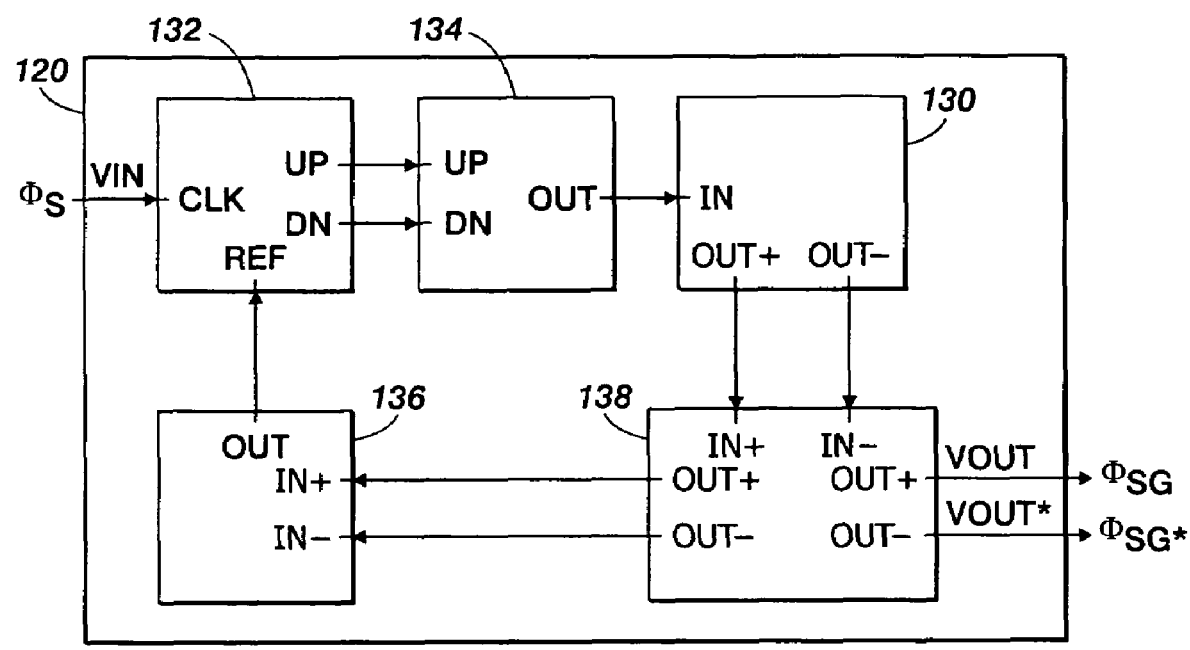
FIG. 4 is a diagram of an embodiment of an analog clock driver.

FIG. 4 is a diagram of an embodiment of an analog clock driver 120. It can be seen that the input to the driver 120 is the system square wave φS, which feeds into a phase-locked loop including voltage controlled oscillator 130. The other elements in the illustrated embodiment are a phase frequency detector 132, low pass filter 134, global pixel clock transmitter 136, and local pixel clock receiver 138.

In the above-described embodiment, the provisional signal is an analog, sinusoidal clock signal; in other possible embodiment, the provisional signal can be a digital square wave simply having a lower amplitude (such as 10% or less by voltage) than the regular clock signal, and will thus provide some performance advantages over using the original system clock signal φS. It is conceivable that the provisional signal be a modified digital signal with relatively "soft" changes in amplitude within each cycle: this may provide practical advantages as well.

Although the illustrated embodiment shows an image recording photosensor array, the teachings herein can be applied to any type of imaging chip or system in which image data is input to or output from the system, such as an LED array as used in electrophotography, or an ink-jet printhead.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method of operating an imaging system, the imaging system including a plurality of subsets of imaging elements, the imaging elements using a regular clock signal for operation, the regular clock signal having a first waveform and amplitude, comprising:
   receiving the regular clock signal as an input;
   generating, using the inputted regular clock signal, a provisional clock signal including complementary clock signals with respective waveforms different than the first waveform or with respective amplitudes different than the first amplitude;
   selecting a subset of imaging elements for operation at a particular time;
   supplying the complementary clock signals as differential inputs to a receiver;
   generating the regular clock signal from the differential inputs; and
   transmitting the regular clock signal for use by the selected subset of imaging elements, incidental to an operational period of the selected subset of imaging elements.

2. The method of claim 1, the provisional clock signal being substantially sinusoidal.

3. The method of claim 1, the regular clock signal being substantially a square wave.

4. The method of claim 1, the provisional clock signal having a lower amplitude than the regular clock signal.

5. The method of claim 4, the provisional clock signal having an amplitude of about 10% of the regular clock signal.

6. The method of claim 1, the generating including applying an original clock signal to an analog signal generator.

7. The method of claim 1, the selecting including a shift register signal being associated with the selected subset of imaging elements.

8. The method of claim 1, the converting including applying the provisional clock signal to a flip-flop.

9. The method of claim 1, where each of the imaging elements is associated with at least one of a photosensor, a light emitter, or an ink-jet emitter.

10. An imaging system, comprising:
a plurality of subsets of imaging elements, the imaging elements using a regular clock signal for operation, the regular clock signal having a first waveform and amplitude;
a generator for receiving the regular clock signal as an input and generating a provisional clock signal including complementary clock signals with respective waveforms different than the first waveform or with respective amplitudes different than the first amplitude;
a selector selecting a subset of imaging elements for operation at a particular time; and
a converter for receiving the complementary clock signals as differential inputs, generating the regular clock signal from the differential inputs, and transmitting the regular clock signal for use by the selected subset of imaging elements, incidental to an operational period of the selected subset of imaging elements.

11. The system of claim 10, the provisional clock signal being substantially sinusoidal.

12. The system of claim 10, the regular clock signal being substantially a square wave.

13. The system of claim 10, the provisional clock signal having a lower amplitude than the regular clock signal.

14. The system of claim 13, the provisional clock signal having an amplitude of about 10% of the regular clock signal.

15. The system of claim 10, the generator including an analog signal generator.

16. The system of claim 10, the selector associating a shift register signal with the selected subset of imaging elements.

17. The system of claim 10, the converter applying the provisional clock signal to a flip-flop.

18. The system of claim 10, where each of the imaging elements is associated with at least one of a photosensor, a light emitter, or an ink-jet emitter.

19. A method of operating an imaging system including a plurality of subsets of imaging elements, the imaging elements using a regular clock signal for operation, the regular clock signal having a first waveform and amplitude, comprising:
receiving, in the system, a system square wave with the first waveform and amplitude;
generating, from the system square wave, a provisional clock signal having a waveform different than the first waveform or having an amplitude less than the first amplitude;
selecting a subset of the plurality of imaging elements for operation at a particular time; and,
supplying the provisional clock signal to imaging elements in the plurality of imaging elements other than those in the selected subset of the plurality of imaging elements.

* * * * *